United States Patent
Jendrowski et al.

(10) Patent No.: US 10,926,786 B2
(45) Date of Patent: Feb. 23, 2021

(54) STEERING WHEEL WITH DISTRIBUTED SENSORS

(71) Applicant: Key Safety Systems, Inc., Sterling Heights, MI (US)

(72) Inventors: Michael Jendrowski, Washington Township, MI (US); Byron Spencer, Bloomfield Hills, MI (US); Roland Furtado, Novi, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 16/067,105

(22) PCT Filed: Dec. 21, 2016

(86) PCT No.: PCT/US2016/067998
§ 371 (c)(1),
(2) Date: Jun. 28, 2018

(87) PCT Pub. No.: WO2017/120050
PCT Pub. Date: Jul. 13, 2017

(65) Prior Publication Data
US 2019/0009812 A1 Jan. 10, 2019

Related U.S. Application Data

(60) Provisional application No. 62/274,910, filed on Jan. 5, 2016.

(51) Int. Cl.
*B62D 1/04* (2006.01)
*B60K 35/00* (2006.01)
(Continued)

(52) U.S. Cl.
CPC .............. *B62D 1/046* (2013.01); *B60K 35/00* (2013.01); *B60K 37/06* (2013.01); *G06F 3/016* (2013.01);
(Continued)

(58) Field of Classification Search
CPC ........... B60K 2370/782; G06F 3/04883; G06F 3/017; G06F 3/044
See application file for complete search history.

(56) References Cited

U.S. PATENT DOCUMENTS 6,300,939 B1 * 10/2001 Decker .................. B60K 35/00
345/157
8,451,109 B1 * 5/2013 Daniel .................. B62D 1/046
340/438

(Continued)

FOREIGN PATENT DOCUMENTS

JP 2013082423 A 5/2013

OTHER PUBLICATIONS

"Steering Wheel Sizes." Dimensions Info, May 7, 2014, www.dimensionsinfo.com/steering-wheel-sizes/ (Year: 2014).*

*Primary Examiner* — Koosha Sharifi-Tafreshi
(74) *Attorney, Agent, or Firm* — Meunier Carlin & Curfman LLC

(57) ABSTRACT

An information processing and display system comprising steering wheel (10) having a rim (12) and at least one spoke (14), and a plurality of sensors (102, 106, 108) placed about one or both of the rim and the spoke, each sensor selectively actuable due to the proximity of a finger, fingers, a hand or hands of a driver; and a processor, logic device or computer (120) in communication with each sensor and capable of detecting specific hand or finger movements corresponding to specific desirable functions.

19 Claims, 4 Drawing Sheets

(51) Int. Cl.
*B60K 37/06* (2006.01)
*G06F 3/01* (2006.01)
*G06F 3/03* (2006.01)

(52) U.S. Cl.
CPC .......... *G06F 3/03* (2013.01); *B60K 2370/122* (2019.05); *B60K 2370/143* (2019.05); *B60K 2370/146* (2019.05); *B60K 2370/1468* (2019.05); *B60K 2370/158* (2019.05); *B60K 2370/164* (2019.05); *B60K 2370/197* (2019.05); *B60K 2370/48* (2019.05); *B60K 2370/744* (2019.05); *B60K 2370/782* (2019.05)

(56) References Cited

U.S. PATENT DOCUMENTS

| | | | | |
|---|---|---|---|---|
| 8,547,215 | B2* | 10/2013 | Sanma | B62D 1/046 340/438 |
| 9,159,221 | B1* | 10/2015 | Stantchev | B62D 1/06 |
| 2002/0068605 | A1* | 6/2002 | Stanley | B60R 11/0264 455/556.1 |
| 2003/0002910 | A1* | 1/2003 | Jeffries | G06F 3/0202 400/714 |
| 2003/0167669 | A1* | 9/2003 | Rohne | G09F 3/02 40/594 |
| 2005/0052426 | A1* | 3/2005 | Hagermoser | H03K 17/962 345/173 |
| 2005/0073195 | A1* | 4/2005 | Popilek | B60K 37/06 307/10.1 |
| 2005/0189159 | A1 | 9/2005 | Weber | |
| 2010/0268426 | A1* | 10/2010 | Pathak | G06F 3/0482 701/48 |
| 2011/0115617 | A1* | 5/2011 | Bennett | B60Q 1/50 340/439 |
| 2011/0133919 | A1* | 6/2011 | Evarts | B60Q 9/00 340/439 |
| 2012/0179328 | A1 | 7/2012 | Goldman-Shenhar | |
| 2012/0242465 | A1* | 9/2012 | Murata | B60Q 9/00 340/407.2 |
| 2014/0292661 | A1* | 10/2014 | Graumann | B62D 1/046 345/168 |
| 2015/0307022 | A1* | 10/2015 | Nelson | B60W 50/16 701/36 |
| 2015/0331605 | A1* | 11/2015 | Park | G06F 3/0482 715/773 |
| 2015/0360567 | A1* | 12/2015 | Sannomiya | G06F 3/04883 345/174 |
| 2017/0297603 | A1* | 10/2017 | Murakami | G06F 3/016 |

\* cited by examiner

STEERING WHEEL WITH DISTRIBUTED SENSORS

BACKGROUND AND SUMMARY OF THE INVENTION

In an increasingly electronic vehicle environment, automobile manufacturers are looking for cost effective ways for the driver to control the various functions available in the vehicle. Automobile manufacturers also desire to know if a driver is in control of the vehicle at all times. One indicator of this is the implementation of a hands-on-wheel (steering wheel) sensor.

In the present invention a number of sensors are arrayed along the steering wheel rim and/or spoke surfaces such that the presence or absence of a finger or hand in contact with the steering wheel can be detected. Additionally the system is sensitive to detect various specific hand/finger movements pre-ordained with special meaning to activate or vary specific desired functions. The present invention can also eliminate the need for many if not all of the costly discrete mechanical switches currently used on steering wheels and provide a reduction in complexity, weight and cost.

The present invention includes, an information processing and display system comprising steering wheel having a rim and at least one spoke, and a plurality of sensors placed about one or both of the rim and the spoke, each sensor selectively actuable due to the proximity of a finger, fingers, a hand or hands of a driver; and a processor, logic device or computer in communication with each sensor and capable of detecting specific hand or finger movements corresponding to specific desirable functions. A visual display can be used to show the driver a selected function and the state of the selected function which is changeable by action of the driver by movement of his or her finger(s) or hand(s). Such information processing and display system can be connected to any available serial data bus and post information for general use or use available information concerning vehicle systems status. For instance certain functions might be suppressed while the vehicle is moving but otherwise be available; etc.

DETAILED DESCRIPTION OF THE DRAWINGS

Figure 1:
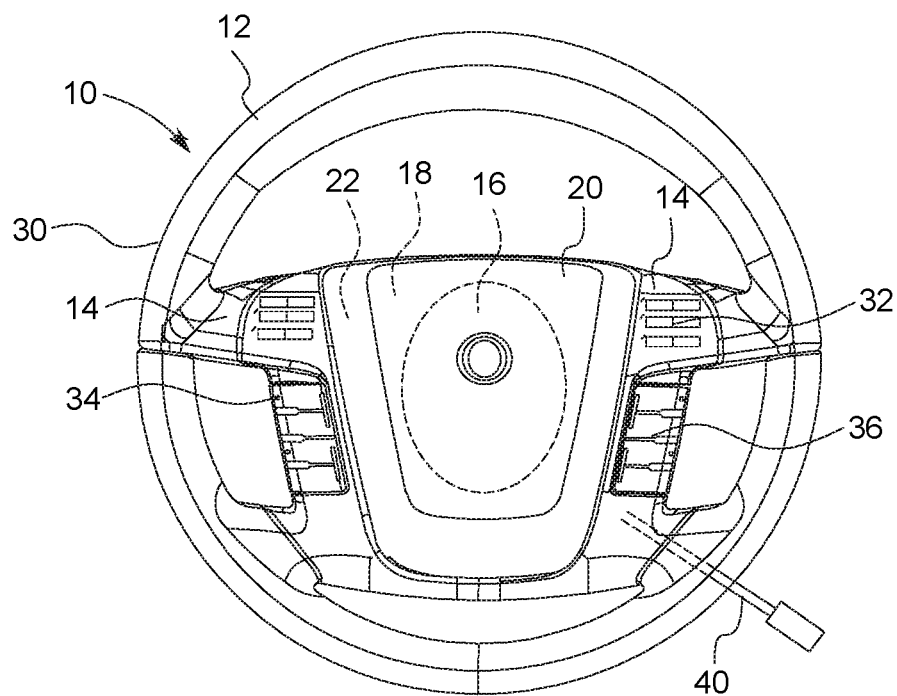
FIG. 1 diagrammatically illustrates a prior art steering wheel.

Reference is made to FIG. 1 which illustrates a conventional steering wheel 10 having a rim 12, a number of spokes 14 and a hub 16. Situated over the hub is a driver airbag module 18 comprising a cover 20 and airbag 22 and a housing which is not visible in FIG. 1. Characteristic of a conventional steering wheel such as 10 is the use of a plurality of mechanical switches or buttons mounted at various locations on the steering wheel. For example one set of buttons such as 30 is mounted on one spoke 14 and another set of buttons 32 is mounted to the other spoke 14. Another set of buttons 34 is mounted below the first set of buttons 30 and adjacent the driver airbag module 18. A second set of buttons 36 is similarly mounted but on the other side of the driver airbag module. This array of switches will vary with vehicle.

As can be seen the surface area available for additional buttons, switches and the like is limited. This is especially important with modern-day vehicles which incorporate a multitude of old and new standard, electric and electromechanical functions which require driver input. Steering wheel 10 may also include a variety of switches such as 40 which are useful to control the adaptive speed control system of the vehicle as a further example of a conventional switch. Many existing vehicles utilize one of the sets of buttons such as 30 or 32 to provide this driver controlled and activated function. One of the deficiencies of the existing array of switches is that the locations of the functions cannot be changed.

Figure 2:
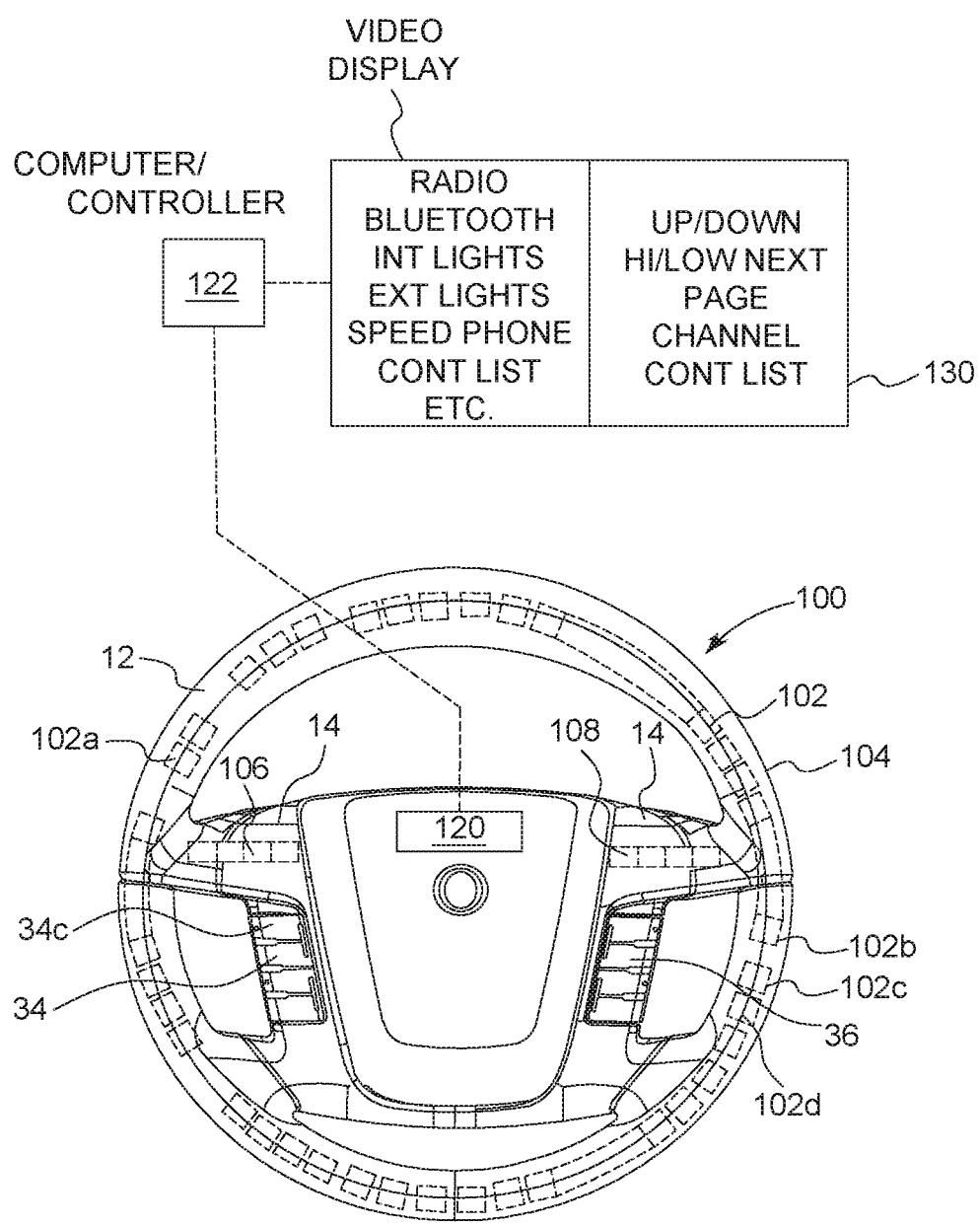
FIG. 2 shows another steering wheel in which the present invention incorporates some of the buttons found in a conventional steering wheel.

Reference is made to FIG. 2 which illustrates some of the features of the present system. FIG. 2 shows the progression from the standard steering wheel illustrated in FIG. 1 to the full use of the present invention. The steering wheel 100 includes a plurality of sensors 102 located about the steering wheel rim and/or spoke. Depending on the construction of the steering wheel, these sensors can be located on the armature or in or on a covering layer such as polyurethane typically molded about the armature of the steering wheel and below a typically flexible or rigid covering material layer 101 such as leather or vinyl (flexible or rigid). In FIG. 2 the set or cluster of sensors 102 are positioned about the rim 12 of steering wheel 100. An additional set or cluster of sensors 106 and 108 are positioned upon each spoke 14 under a covering material layer 104. As can also be seen a plurality of the conventional buttons or switches 34 and 36 are also employed in this improved steering wheel 100. The sensors 102, 106, and 108 can be in the form of capacitors, inductors, piezo-resistors, light sensing diodes, etc. and are arrayed sufficiently close to the steering wheel rim outer surface so that each sensor or group of adjacent sensors can be activated by the driver's hand, hands and or finger or fingers. The presence or absence of a hand or finger in proximity of the given sensor or group of sensors on the steering wheel can be detected by a suitable logic device, computer, programmable controller or conditioning circuit all shown as controller 120. For example pairs of sensors adjacent to one another will sense the movement of a hand or finger(s) from one to the other.

Each of the existing switches 34, 36 and the new sensors 102, 106 and 108 are communicated to controller 120, the output of which is communicated to another controller or computer 120 and then communicated to a video display 130 which is preferably in the line-of-sight of the driver. This video display can be located in the dashboard with other displays or alternatively displayed on the windshield of the vehicle. For example if switch 34a or if a sensor such as 102a is depressed the video display will indicate the function associated with the depressed switch or activated sensor. In this case let's assume switch 34a is representative of a radio which when activated is shown on the display. The driver can then select any two or more adjacent switches such as 102b, 102c or 102d and slide or swipe his or her finger clockwise along the sensors thereby changing the state of the radio station to a higher numbered station or alternatively slide his or her finger in a counterclockwise direction to choose another station. This functionality can be replicated with other necessary functions within the vehicle. For example assuming sensor 102a when activated corresponds to the speed of the vehicle, this function is displayed in the video display and when the driver slides his or her hand or finger along adjacent sensors the speed can be changed correspondingly. One of the benefits of the present invention is the location of a sensor associated with a particular function can be changed to accommodate driver desires. For example, while sensor 102a may be located at the factory at the 10 o'clock position the driver can reprogram this functionality to be for example at the 3 o'clock position where sensor 102b is located. FIG. 2 shows some of the features that can be activated by choosing a selected and preprogrammed (or programmable) sensor which is then displayed in the video display and then which function can be changed by sliding a hand or finger along adjacent sensors in the cluster of sensors 102, 106 and 108.

While the present invention shows a way to dramatically increase the number of user accessible functions that can be associated with the steering wheel the present invention can also be used to determine whether or not a driver has his or her hand on the steering wheel which is often referred to as a hands-on-wheel sensor or function. A typical diameter for a vehicle steering wheel is 38 cm (15 inches), its rim circumference is therefore about 127 cm (50 inches) and a typical hand is approximately 10 cm (4 inches) wide so in this case a minimum of 13 such sensors each having a width of approximately 0.76 cm, is required to detect if a hand is in contact anywhere on the steering wheel rim. Consequently, if any 13 sensors about the steering wheel are not simultaneously activated a warning signal can be sent to the driver via the video display or alternatively by an audible signal as well as stored in the vehicles CPU. A typical finger may be 1.27 cm (½ inch) wide; consequently if one sensor is to be used as a switch for a particular function, the size of that one sensor should be about the width of a finger. Smaller sensors might be arrayed strategically on the steering wheel to detect individual fingers for more complex switching functions.

Depending on the number of independent sensors about the rim and/or spokes the system can be programmed with more and more complex specific hand/finger movements that are pre-ordained with special meaning to activate many desirable functions.

Such functions can be spatially oriented with respect to the steering position or the vehicle interior. Some functions can be precluded if the steering wheel is not substantially straight ahead, etc. More functions can be enabled by coupling the logic device, controller, etc. to one or more visual or tactile driver display units.

As can be appreciated the present invention will eliminate the need for many costly discrete mechanical switches and thus reduce much complexity, weight and cost of the steering wheel.

Figure 3:
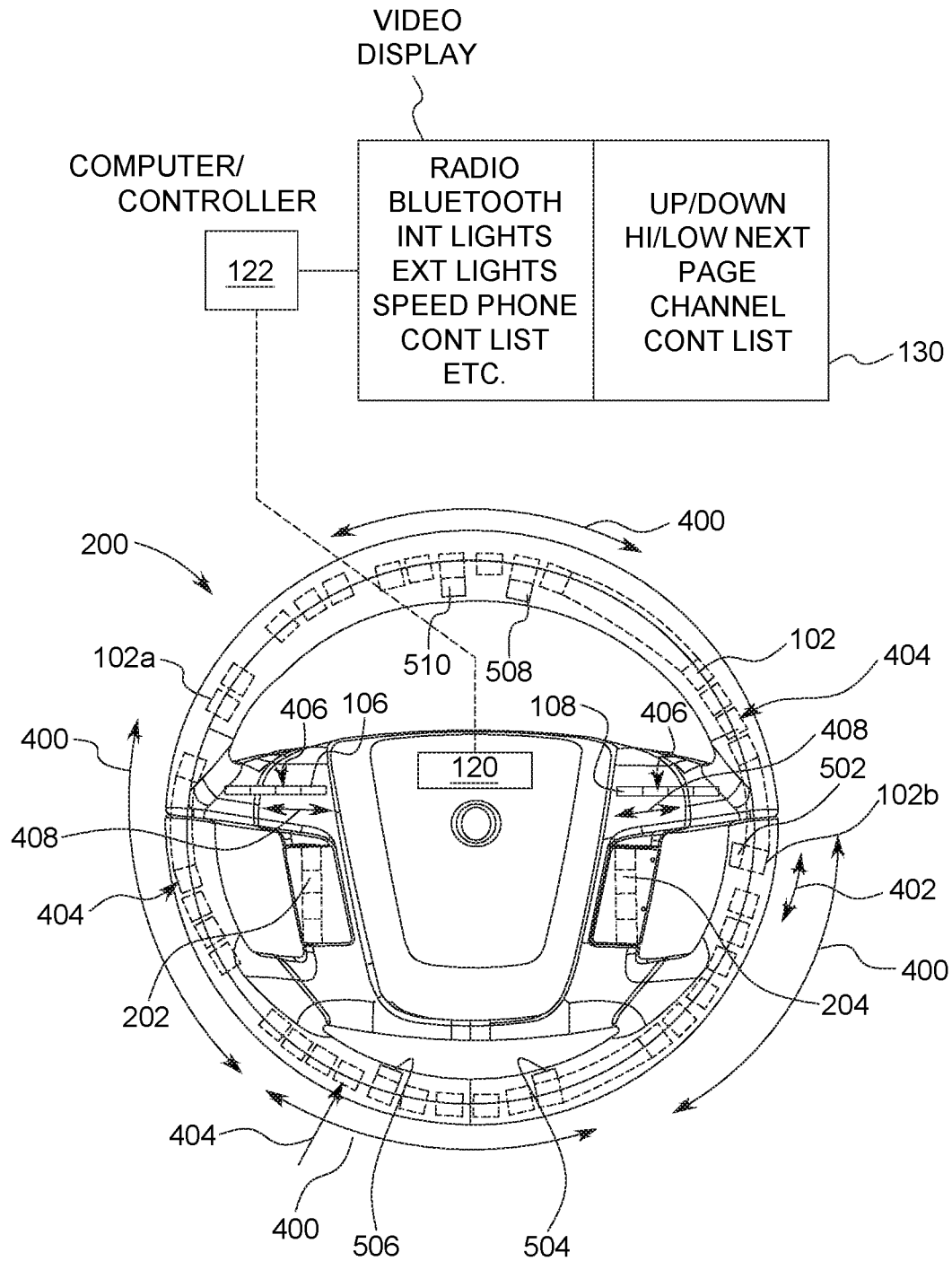
FIG. 3 is another steering wheel using the present invention devoid of classic steering wheel buttons.

Reference is made to FIG. 3 which illustrates a further variation of the present invention. More specifically a steering wheel 200 is shown having a plurality of sensors 102, 106, 108, 202 and 204. In this configuration all of the conventional mechanical switches shown in FIG. 1 have been replaced by electronic or digital sensors. As previously mentioned each of the sensors are located about the rim and/or spokes of the steering wheel and covered by a covering material. As before when one exemplary switch such as switch 102a is activated the function of this switch is displayed on the video display and the driver has the opportunity to change the corresponding state of this function. As with the steering wheel 100, a number of adjacent sensors can be used as a hands-on-wheel sensor in the manner previously described.

With this combination of sensor/switches 102, 106, 108, 202 and 204 any individual sensor/switch can be used to activate a particular function or alternatively combinations of sensors/switches can be used to activate a particular function. For example the activation of two sensors such as 102a and 102b in a contemporary temporal order could be used to activate the adaptive speed control (radio, lighting, climate control, interior lighting, etc.) whereby the state of any of the above functions can be changed by sliding one's hand or finger along any particular set of sensors. The driver would view the current state of the selected function on the display. FIG. 3 shows a number of arrows. For example those lines with arrows at both ends such as 400 are illustrative of the sliding or swiping action of the driver to change the state of a give function. One such arrow 402 extends across 2 sensors to show the minimum size of the sliding or swiping action to initial a change in state. Another set of arrows 404 are directed radially inward to show the activation of a single sensor on the rim. Another set of arrows 406 on the spokes show the individual activation of a single spoke sensor or another set of arrows 408 to show the swiping action of a plurality of spoke sensors.

Figure 4:
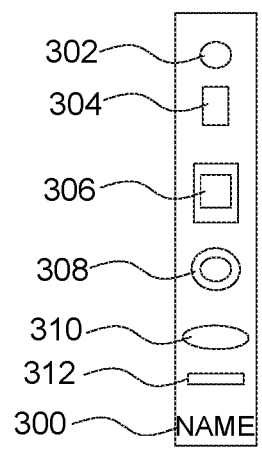
FIG. 4 diagrammatically illustrates a methodology to identify the location and functionality of particular sensors used in the present invention. One of these methodologies is to print the name of the function and/or emboss a three-dimensional feature into the covering material over the sensor.
Figure 5:
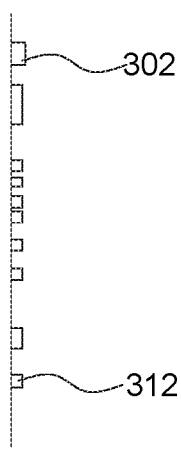
FIG. 5 is a cross-sectional view showing embossed features.

Reference is briefly made to FIGS. 4 and 5. The functionality of some or all of the sensors can be identified in a variety of ways. For example the name or function 300 of a particular sensor can be printed on the covering material as shown in FIG. 4; this name or indicia can be lighted or radiant to be visible in dark situations. Alternately the covering material can be embossed with different shapes, also shown in FIG. 4 with cross-section shown in FIG. 5, such as circular 302, rectangular 304, a double walled rectangle 306 or a double-walled circle 308 and oval 310 or a narrow rectangle 312. Over time the driver will be able to identify the tactile feel of each of these embossed features to more readily identify the sensor/switch that will activate a particular function. The combination of embossing and printing the name of the function can be used simultaneously. Linear Resonance Actuators (LRA) or other type of vibrator under the surface covering of the steering wheel 502-510 and adjacent to all or some of the sensors 102, can provide active tactile feedback to distinguish available switch functions for the driver. The LRAs or vibrators can be activated along with the sensor to provide tactile feedback to the driver and help the driver distinguish which function has been active. One or some of the sensors 102 could also activate a sound such as a bell or ring to further assist in differentiating the selected functions.

Many changes and modifications in the above-described embodiment of the invention can, of course, be carried out without departing from the scope thereof. Accordingly, that scope is intended to be limited only by the scope of the appended claims.

The invention claimed is:

1. An information processing and display system comprising:
    a steering wheel having a rim and at least one spoke, and
    a plurality of sensors placed about the rim or both of the rim and the spoke, each sensor selectively actuable due to the proximity of a finger, fingers, a hand or hands of a driver and a plurality of linear resonance actuators or other type of vibrators positioned adjacent all or some of the sensors and activated when a corresponding sensor is activated to provide tactile feedback to the driver to help distinguish to the driver the function associated with the sensor activated;

a flexible or rigid covering material layer;

a processor, logic device or computer in communication with each sensor and capable of detecting specific hand or finger movements corresponding to specific desirable functions; and wherein each of the sensors is located about the rim and/or spokes of the steering wheel and is covered by and is below the covering material layer, and wherein adjacent sensors mounted under or below the covering material layer about said rim along the rim's circumference are used as a hands-on-wheel sensor and the processor is configured to detect that a single hand is contacting the rim when two or more adjacent sensors are activated.

2. The system according to claim 1 further including a visual display to show the driver a selected function and the state of the selected function.

3. The system according to claim 1 wherein the sensors can be activated individually, or as a part of a group of sensors having no fewer than two adjacent sensors or in seriatim as a hand or finger of a driver is slid or swiped from one sensor to at least one other adjacent sensor.

4. The system according to claim 1 wherein the plurality of sensors about one or both of the rim and/or spokes are programmable by more and more complex specific hand/finger movements that are pre-ordained with special meaning to activate other desirable functions.

5. The system according to claim 4 wherein the functions can be spatially oriented with respect to the steering position or the vehicle interior.

6. The system according to claim 5 wherein some functions are precluded by the steering wheel orientation not being in a straight driving forward position.

7. The system according to claim 1 wherein functions are enabled by coupling the logic device, controller or processor to one or more visual or tactile driver display units.

8. The system according to claim 1 wherein the functionality of some or all of the sensors are identified in a variety of ways including the name or indicia or function of a particular sensor being printed or embossed on the covering material.

9. The system according to claim 8 wherein the name or indicia is lighted or radiant to be visible in dark situations.

10. The system according to claim 1 wherein the covering material is embossed with different shapes.

11. The system according to claim 10 wherein the shapes include circular, rectangular, a double walled rectangle or a double walled circle, an oval, or a narrow rectangle.

12. The system according to claim 11 wherein the driver identifies the tactile feel of each of these embossed features to more readily identify the sensor/switch that will activate a particular function.

13. The system according to claim 8 wherein a combination of embossing and printing the name of the function is used simultaneously.

14. The system according to claim 1 wherein the plurality of Linear Resonance Actuators (LRA) or other type of vibrator are positioned under the surface covering of the steering wheel and adjacent to all or some of the sensors to provide active tactile feedback to distinguish available switch functions for the driver.

15. The system according to claim 14 wherein the LRAs or vibrators are activated along with the sensor to provide tactile feedback to the driver and help the driver distinguish which function has been active.

16. The system according to claim 1 wherein one or some of the sensors activates a sound to further assist in differentiating the selected functions.

17. The system according to claim 1 wherein the rim has a circumference of about 127 cm.

18. The system according to claim 1 wherein the adjacent sensors in the rim have a width of about 0.76 cm.

19. The system according to claim 18 wherein a minimum of 13 sensors is required to detect a hand is in contact anywhere on the steering wheel rim.

* * * * *